Oct. 22, 1968     R. C. SCHENCK, JR     3,406,707
TOP CAP AND STEM SEAL FOR VALVES
Filed Jan. 6, 1967
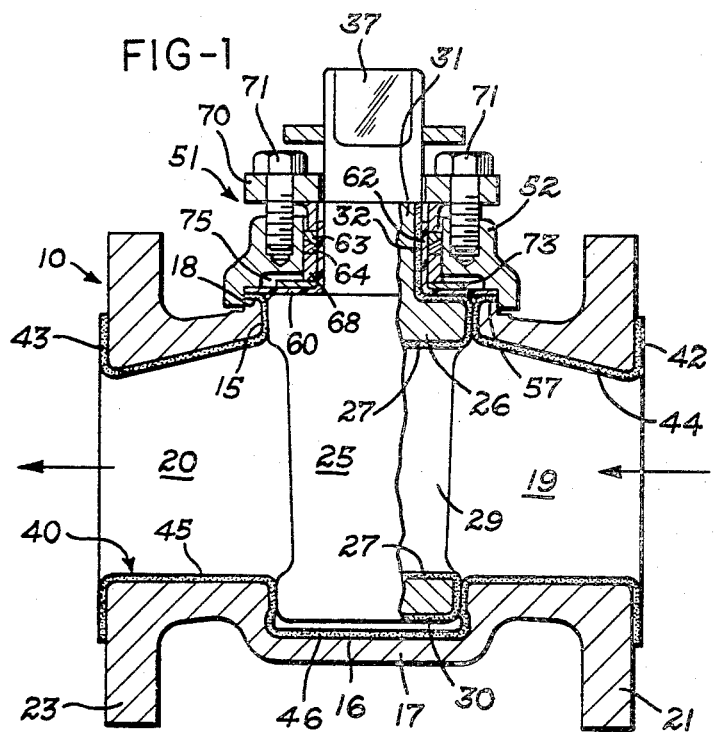
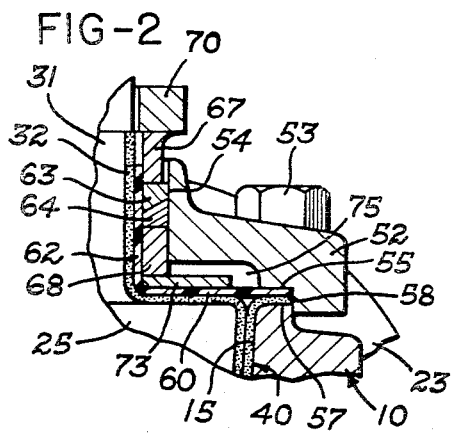
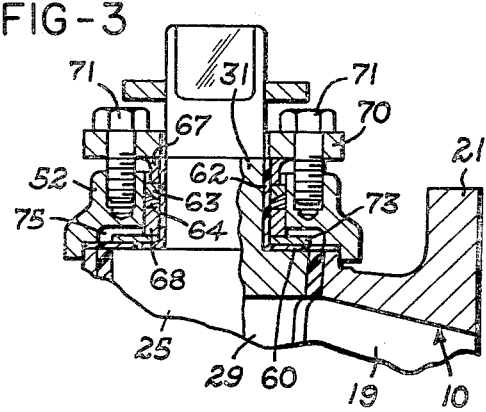
INVENTOR
ROBERT C. SCHENCK, JR.
BY
*Marechal, Biebel, French & Bugg*
ATTORNEYS

United States Patent Office 3,406,707
Patented Oct. 22, 1968

3,406,707
TOP CAP AND STEM SEAL FOR VALVES
Robert C. Schenck, Jr., Dayton, Ohio, assignor to The Duriron Company, Inc., Dayton, Ohio, a corporation of New York
Continuation-in-part of application Ser. No. 497,825, Oct. 19, 1965. This application Jan. 6, 1967, Ser. No. 607,703
7 Claims. (Cl. 137—375)

ABSTRACT OF THE DISCLOSURE

The top cap and valve stem of a valve are sealed by a polytetrafluoroethylene diaphragm including a vertically extending section through which the valve stem extends. A pair of polytetrafluoroethylene wedge rings of trapezoidal cross-section positioned around the outer surface of the vertically extending section are forced together by a pair of stainless steel glands. The turning torque of the valve member can be reduced without affecting the stem seal.

Related applications

This application is a continuation-in-part of application Ser. No. 497,825, filed Oct. 19, 1965, and assigned to the same assignee as this application.

Field of invention

This invention relates to corrosion resistant valves and more particularly to an improved top cap and stem seal for a valve having a rotatable valving member.

Valves of the type to which the present invention relate are shown in U.S. Patents Nos. 2,987,295 and 3,205,163, both assigned to the same assignee as this application.

Summary of the invention

An object of the present invention is to provide an improved top cap and stem seal structure for corrosion resistant valves which include a rotatable valving member, and wherein adjustment of the turning torque of the valving element can be reduced without substantially affecting the stem seal.

Another object of the present invention is to provide a top cap and seal stem structure for plug valves wherein a polytetrafluoroethylene diaphragm including a vertical annular section is clamped between the top cap and valve body so that the stem of the plug extends through the vertical section and wherein polytetrafluoroethylene wedge rings are so positioned that when compressed by spaced thrust glands, the rings seal against the stem and prevent passage of fluid out of the top cap even if the diaphragm leaks.

Other objects and advantages of the invention will be apparent from the following description, the accompanying drawing and the appended claims.

Description of the drawing

FIG. 1 is a view partly in section and partly in elevation of a fully lined valve including a fully lined plug utilizing the top cap and stem seal of the present invention;

FIG. 2 is an enlarged fragmentary section of the top cap and stem seal in accordance with the present invention; and FIG. 3 is a view of the top cap and stem seal of the present invention in a plug valve utilizing a sleeve as a seal element.

Description of the preferred embodiments

Referring to the drawing, which illustrates a preferred embodiment of the present invention, FIG. 1 shows a fully lined valve including a one-piece metallic body 10 having a tapered bore 15 extending transversely thereof. The body may be of ductile iron, aluminum or carbon steel. The base 16 of the bore is closed by an integral portion 17 of the body while the other end 18 is open. The body includes through ports 19–20 communicating with the bore for passage of fluid through the valve. The body also includes end flanges 21 and 23 for mounting the valve in a conduit.

Received in the tapered bore 15 is a fully lined valving member or plug 25 which consists of a metal core or center 26 having an outer sheath 27 of a fluorocarbon resin such as polytetrafluoroethylene (PTFE) or a copolymer of polytetrafluoroethylene and hexafluoropropylene. This sheath covers all exposed surfaces of the plug including the port 29 through the plug and the base 30 thereof as well as extending at least partially up the stem 31 as indicated at 32. Plug 25 is preferably tapered to be received in the bore 15 and includes flats 37 for rotation thereof from an open to a closed position.

The bore of the valve 10 and all interior surfaces of the body exposed to fluid flow are covered by an integral one-piece polytetrafluoroethylene liner 40 (shown as stippled) including flared end portions 42 and 43 turned outwardly and engaging flanges 21 and 23, respectively, so that if the valve is mounted in a conduit, the flared end portions of the liner are in contact with the ends of the conduit. The liner includes portions 44 and 45 in contact with all portions of the through ports 19 and 20 as well as portion 46 covering the bottom 16 of the bore 15. Further details of the valve body, plug and liner, as well as the method of assembly of these parts is set forth in the above-identified application, the disclosure of which is incorporated by reference herein.

In accordance with the present invention, a top cap and stem seal assembly 51 is provided which includes top cap 52 mounted on the body 10 by a bolt and nut assembly 53 (FIG. 2). The valve stem 31 passes through an opening 54 in the top cap, and the portion of the top cap facing the body is provided with a counterbore 55 which is in opposed relation to the circumferential flat 57 on the body. The liner 40 includes a circular portion 58 in contact with the flat, and positioned between the counterbore of the top cap 52 and the circular portion 58 of the liner is a one-piece PTFE diaphragm member 60 including a vertically extending generally annular section 62 which surrounds the stem 31 of the plug and which is in opposed relation with the outer surface of the coated portion 32 of the plug stem. By tightening down the bolt assemblies 53, the top cap is secured to the body with a seal being provided therebetween by the diaphragm which, along with the continuous ring portion 58 of the liner, is clamped between the counterbore 55 and the flat 57.

Referring to FIG. 2, wherein like reference numerals have been used, the top cap and stem seal assembly 51 also includes a pair of generally annular PTFE wedge rings 63 and 64 received between the outer periphery of the vertically extending annular portion 62 of the diaphragm and the opening 54 in the top cap.

Positioned above and below the wedge rings 63 and 64 are thrust glands 67 and 68 which are urged toward each other by a gland follower 70 which may be adjusted by turning bolts 71. By urging the thrust glands toward each other, the wedge rings are compressed and form an annular band of high unit pressure around the outer periphery of the stem by urging the opposed portion of the vertically extending annular section 62 of the diaphragm 60 against the stem. Since the wedge rings are trapezoidal in cross-section, as shown, the inner and outer periphery of each wedge ring constitutes a sealing surface, with the outer periphery of the wedge ring being sealed against the top cap 52.

Positioned between the lower thrust gland 68 and the disk-like portion of the diaphragm 60 is a flat thrust washer 73 which is urged toward the flat top surface of valving element 25 by the wedge rings thereby sealing the diaphragm against the top of the valving element and urging the valving member into the bore of the body.

The advantages of the seal structure shown in FIGS. 1 and 2 are high sealing pressure between the top cap and stem, and in the event that line pressure forces fluid into the top seal, the wedge rings are forced together by pressure acting against the thrust washer which forces the gland 68 toward gland 67 to compress the wedge rings. It is also possible with the seal assembly shown in FIGS. 1 and 2 to adjust the position of the valving element in the bore by backing off the bolts 71 which will permit the valving member to move vertically out of the bore a very small amount. This operates to reduce the turning torque of the valving member but does not substantially affect the high unit sealing pressure of the wedge rings since line pressure is now operative to compress the wedge rings.

Of noteworthy importance of the seal structure shown in FIGS. 1 and 2 is that rupture of the diaphragm 60, or leakage through the diaphragm does not permit fluid to pass through the top of the valve. Specifically, should the diaphragm ruputre, fluid enters the space 75 between the top of the valving member and the top cap but cannot pass around the wedge rings which are sealed to the top cap, and to the valve stem through the vertically extending section of the diaphragm. This is particularly important in valves designed for corrosive services. It is for this reason that the thrust washer and gland members are made of stainless steel in order to resist corrosion of any fluid which may have leaked from the bore into space 75.

The desirable features of the top cap and valve stem seal described in FIGS. 1 and 2 may also be utilized in a conventionally designed plug valve utilizing a sleeve or other element as the seal between the plug and body. Referring to FIG. 3 wherein like reference numerals have been used where applicable, trapezoidal-shaped wedge rings 63 and 64 are forced together by gland members 67 and 68 operated by the gland follower 70 and bolts 71. The disk-like thrust washer 73 cooperates with the flat disk-like portion of the diaphragm 60 to provide a seal along the top of the plug 25 which in the embodiment shown in FIG. 3 may be an uncoated metal plug of stainless steel or the like. The stem 31, which is not coated with a corrosion resistant plastic, is surrounded by the vertically extending annular section 62 of the diaphragm 60, and the seal to the plug stem is by the wedge rings and gland members as previously described. The structure shown in FIG. 3 also possesses the desirable and advantageous operating features of the top cap and stem seal assemblies previously described in connection with FIGS. 1 and 2.

The top cap and stem seal structures above described have been tested under severe conditions of corrosion with various fluids, for example nitric acid, hydrofluoric acid at elevated temperatures, bromine, hydrochloric acid, cuprous chloride, acid brine, chlorosulfonic and monochloroacetic acids. In pressure tests, valves utilizing the stem seals above described were tested from conditions ranging from 15-mm. mercury vacuum to 300 p.s.i. and at temperatures ranging from −25° F. to 400° F. in which various solutions were handled among which were toluene and 98% sulfuric acid. Other tests in which the valve operated satisfactorily included tests with steam at 125 p.s.i.g. and a hot oil test at about 400° to 425° F.

While the forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. In a valve wherein the body includes a bore and ports opening into said bore, a valving member received in said bore and rotatable from one position to another, seal means in said bore and cooperating with said valving member to prevent flow of fluid through said valve when said valving member is in a closed position, said valving member including a stem extending away from said bore, a top cap mounted on said body and including an aperture for passage of said stem therethrough, an improved top cap and stem seal comprising a diaphragm received between said top cap and body, first and second gland members positioned around said stem and spaced axially from each other, said diaphragm including a vertical annular section surrounding said stem and extending between said stem and said gland members, a flat thrust washer positioned over said diphragm and surrounding said stem, said first gland member being in contact with said thrust washer, a pair of annular wedge rings surrounding said stem and positioned around said vertical annular section of said diaphragm, said wedge rings between said gland members and compressible thereby, each said wedge ring including an inner and outer peripheral surface in engagement with said annular section of said diaphragm and said top cap respectively, a gland follower positioned around said stem and contacting said second gland member forcing said gland members toward each other and urging said thrust washer toward said valving member whereby said wedge rings are compressed to provide a stem seal while said thrust washer compresses said diaphragm on said valving member, said diaphragm being sealed between said top cap and said body to prevent leakage of fluid out of said body, and means in said top cap defining a space above said thrust washer permitting movement of said diaphragm and thrust washer in response to fluid pressure to compress said wedge rings.

2. A valve as set forth in claim 1 wherein said wedge rings are of polytetrafluoroethylene.

3. A valve as set forth in claim 1 wherein said diaphragm is of polytetrafluoroethylene.

4. A valve as set forth in claim 1 wherein said stem is covered with polytetrafluoroethylene.

5. A valve as set forth in claim 1 wherein each wedge ring is trapezoidal in cross-section.

6. A valve as set forth in claim 1 wherein said having member is a plug having a flat upper surface, and wherein said diaphragm is in sealing relation with said flat upper surface.

7. A valve as set forth in claim 1 wherein said thrust washer and gland members are of stainless steel.

References Cited

UNITED STATES PATENTS

| | | | |
|---|---|---|---|
| 2,208,394 | 7/1940 | Scherer | 251—312 |
| 2,900,995 | 8/1959 | Dickerson et al. | 251—214 X |
| 3,073,336 | 1/1963 | Johnson | 137—375 |
| 3,157,195 | 11/1964 | McIntosh et al. | 137—375 |
| 3,184,213 | 5/1965 | Anderson | 251—316 X |
| 3,227,174 | 1/1966 | Yost | 137—375 |

FOREIGN PATENTS 1,376,755 9/1964 France.

HENRY T. KLINKSIEK, *Primary Examiner.*